(12) United States Patent
Shudo et al.

(10) Patent No.: US 8,171,923 B2
(45) Date of Patent: May 8, 2012

(54) CYLINDER HEAD LUBRICATING STRUCTURE FOR ENGINE

(75) Inventors: Shigeru Shudo, Wako (JP); Go Tanaka, Wako (JP); Hirohisa Ishikawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 385 days.

(21) Appl. No.: 12/468,425

(22) Filed: May 19, 2009

(65) Prior Publication Data
US 2009/0288631 A1  Nov. 26, 2009

(30) Foreign Application Priority Data
May 21, 2008 (JP) .................................. 2008-133207

(51) Int. Cl.
F01M 9/10 (2006.01)
F01M 13/00 (2006.01)
F02B 25/06 (2006.01)

(52) U.S. Cl. ..... 123/572; 123/573; 123/574; 123/193.5; 123/196 R; 123/41.86

(58) Field of Classification Search .......... 123/572–574, 123/41.86, 196 R
See application file for complete search history.

(56) References Cited

U.S. PATENT DOCUMENTS

| | | | |
|---|---|---|---|
| 4,501,234 A * | 2/1985 | Toki et al. ................. | 123/41.86 |
| 4,563,986 A | 1/1986 | Nakano | |
| 4,790,273 A | 12/1988 | Oguri et al. | |
| 5,709,185 A | 1/1998 | Aizawa et al. | |
| 5,937,836 A * | 8/1999 | Yonezawa et al. ............ | 123/572 |
| 5,947,075 A | 9/1999 | Ryu et al. | |
| 6,439,215 B1 * | 8/2002 | Sato et al. ..................... | 123/572 |
| 6,598,595 B2 * | 7/2003 | Yasui ............................ | 123/572 |
| 6,827,068 B1 * | 12/2004 | Sakata et al. ................. | 123/572 |
| 2001/0029910 A1 | 10/2001 | Ito et al. | |
| 2004/0094113 A1 | 5/2004 | Honda et al. | |

FOREIGN PATENT DOCUMENTS

| | | |
|---|---|---|
| EP | 1136665 A2 | 9/2001 |
| JP | 58-156113 U | 10/1983 |
| JP | 60-6585 Y2 | 3/1985 |
| JP | 2002-089219 A | 3/2002 |

OTHER PUBLICATIONS

Japanese Office Action dated Dec. 7, 2011, issued in corresponding Japanese Patent Application No. 2008-133207.

* cited by examiner

*Primary Examiner* — Tea Bajramovic
(74) *Attorney, Agent, or Firm* — Westerman, Hatttori, Daniels & Adrian, LLP

(57) ABSTRACT

In a cylinder head lubricating structure for an engine, in which a breather passage which guides, toward a cylinder head, gas including oil mist generated in a crank chamber by oil splashing means housed in the crank chamber so as to splash-oil in accordance with rotation of a crankshaft is formed in a crankcase, a cylinder block and the cylinder head to supply, toward the cylinder head, lubricating oil through the breather passage, a breather chamber with which an end portion, on the crank chamber side, of the breather passage communicates is formed in the crankcase, and a one-way valve preventing backflow of the oil toward the crank chamber is attached to the crankcase to be located between the crank chamber and the breather chamber. Accordingly, it is possible to supply a sufficient amount of oil to the cylinder head side even when the head difference between the crank chamber and the cylinder head is large.

2 Claims, 6 Drawing Sheets

CYLINDER HEAD LUBRICATING STRUCTURE FOR ENGINE

BACKGROUND OF THE INVENTION

1. Field of the Invention

The present invention relates to cylinder head lubricating structure for an engine, comprising: a crankcase forming a crank chamber storing therein oil, and rotatably supporting a crankshaft; a cylinder head connected to the crankcase with a cylinder block interposed therebetween, the cylinder head having an intake valve and an exhaust valve disposed therein to be capable of opening and closing; oil splashing means housed in the crank chamber so as to splash the oil in accordance with rotation of the crankshaft; and a breather passage formed in the crankcase, the cylinder block and the cylinder head to guide, toward the cylinder head, gas including oil mist generated in the crank chamber by the oil splashing means, and in which lubricating oil is supplied toward the cylinder head through the breather passage.

2. Description of the Related Art

The following cylinder head lubricating structures for engines have already been known through Japanese Utility Model Application Laid-open No. 58-156113 and Japanese Utility Model Publication No. 60-6585, and the like. In the cylinder head lubricating structures for engines, gas including oil mist splashed by oil splashing means is guided toward a cylinder head through a breather passage by using pressure fluctuation in a crank chamber, thereby using the oil mist for lubricating a valve operating mechanism for operating an intake valve and an exhaust valve provided in the cylinder head.

Now, to guide the oil mist generated in the crank chamber toward the cylinder head through the breather passage by using pressure fluctuation in the crank chamber, required is a one-way valve which prevents backflow of the oil mist toward the crank chamber. Each of the structures disclosed in Japanese Utility Model Application Laid-open No. 58-156113 and Japanese Utility Model Publication No. 60-6585 includes a one-way valve provided to a head cover forming a valve operating chamber between the head cover and the cylinder head, the valve operating chamber housing a valve operating mechanism for opening and closing the intake valve and the exhaust valve.

In such a conventional cylinder head lubrication structure, when the head difference from the crank chamber to the cylinder head is large, the oil may flow backward from the middle of the breather passage toward the crank chamber, and, in such a case, it is difficult to supply a sufficient amount of oil to the cylinder head side.

SUMMARY OF THE INVENTION

The present invention has been made in view of the above-described circumstance. It is an object of the present invention to provide a cylinder head lubricating structure for an engine, the cylinder head lubricating structure being capable of supplying a sufficient amount of oil to a cylinder head side through a breather passage even when the head difference between a crank chamber and a cylinder head is large.

In order to achieve the object, according to a first feature of the present invention, there is provided a cylinder head lubricating structure for an engine, comprising: a crankcase forming a crank chamber storing therein oil, and rotatably supporting a crankshaft; a cylinder head connected to the crankcase with a cylinder block interposed therebetween, the cylinder head having an intake valve and an exhaust valve disposed therein to be capable of opening and closing; oil splashing means housed in the crank chamber so as to splash the oil in accordance with rotation of the crankshaft; and a breather passage formed in the crankcase, the cylinder block and the cylinder head to guide, toward the cylinder head, gas including oil mist generated in the crank chamber by the oil splashing means, and in which lubricating oil is supplied toward the cylinder head through the breather passage, wherein a breather chamber with which an end portion, on the crank chamber side, of the breather passage communicates is formed in the crankcase, and a one-way valve is attached to the crankcase to be located between the crank chamber and the breather chamber, the one-way valve preventing backflow of the oil toward the crank chamber.

According to the first feature of the present invention, the breather chamber with which the end portion, on the crank chamber side, of the breather passage communicates is formed in the crankcase, and the one-way valve is attached to the crankcase to be located between the crank chamber and the breather chamber so as to prevent backflow of the oil toward the crank chamber. Accordingly, when pressure inside the crank chamber increases by pressure fluctuation in the crank chamber, the gas including oil mist is guided to the breather chamber by the one-way valve, thus preventing the oil mist and the gas from flowing backward from the breather chamber to the crank chamber. This prevents backflow of the oil toward the crank chamber and thereby makes it possible to supply a sufficient amount of oil to the cylinder head, even when the head difference between the crank chamber and the cylinder head is large.

According to a second feature of the present invention, in addition to the first feature, a down passage part extending downward from the breather chamber is formed at a position, on the breather chamber side, in the breather passage.

According to the second feature of the present invention, the down passage part extending downward from the breather chamber communicating with an upstream end of the breather passage is formed. This prevents backflow of the oil from the breather chamber toward the crank chamber while allowing the oil liquefied in the breather chamber and the breather passage to be stored in the down passage part. Thereby, the oil stored in the down passage part by the action of the pressure from the crank chamber side can be efficiently conveyed toward the cylinder head.

An oil dipper 32 of an embodiment corresponds to the oil splashing means of the present invention; a first down passage part 62*a* of the embodiment corresponds to the down passage part of the present invention; and a second breather chamber 64 of the embodiment corresponds to the breather chamber of the present invention.

The above description, other objects, characteristics and advantages of the present invention will be clear from detailed descriptions which will be provided for the preferred embodiment referring to the attached drawings.

BRIEF DESCRIPTION OF THE DRAWINGS

FIG. 1 is a longitudinal cross-sectional side view of an engine and a cross-sectional view taken along a line 1-1 in FIG. 2; FIG. 2 is a cross-sectional view taken along a line 2-2 in FIG. 1; FIG. 3 is a view from an arrow 3 in FIG. 1; FIG. 4 is a view from an arrow 4 in FIG. 2; FIG. 5 is a cross-sectional view taken along a line 5-5 in FIG. 4; FIG. 6 is a cross-sectional view taken along a line 6-6 in FIG. 4; and FIG. 7 is a cross-sectional view taken along a line 7-7 in FIG. 6.

DESCRIPTION OF THE PREFERRED EMBODIMENT

Figure 1:
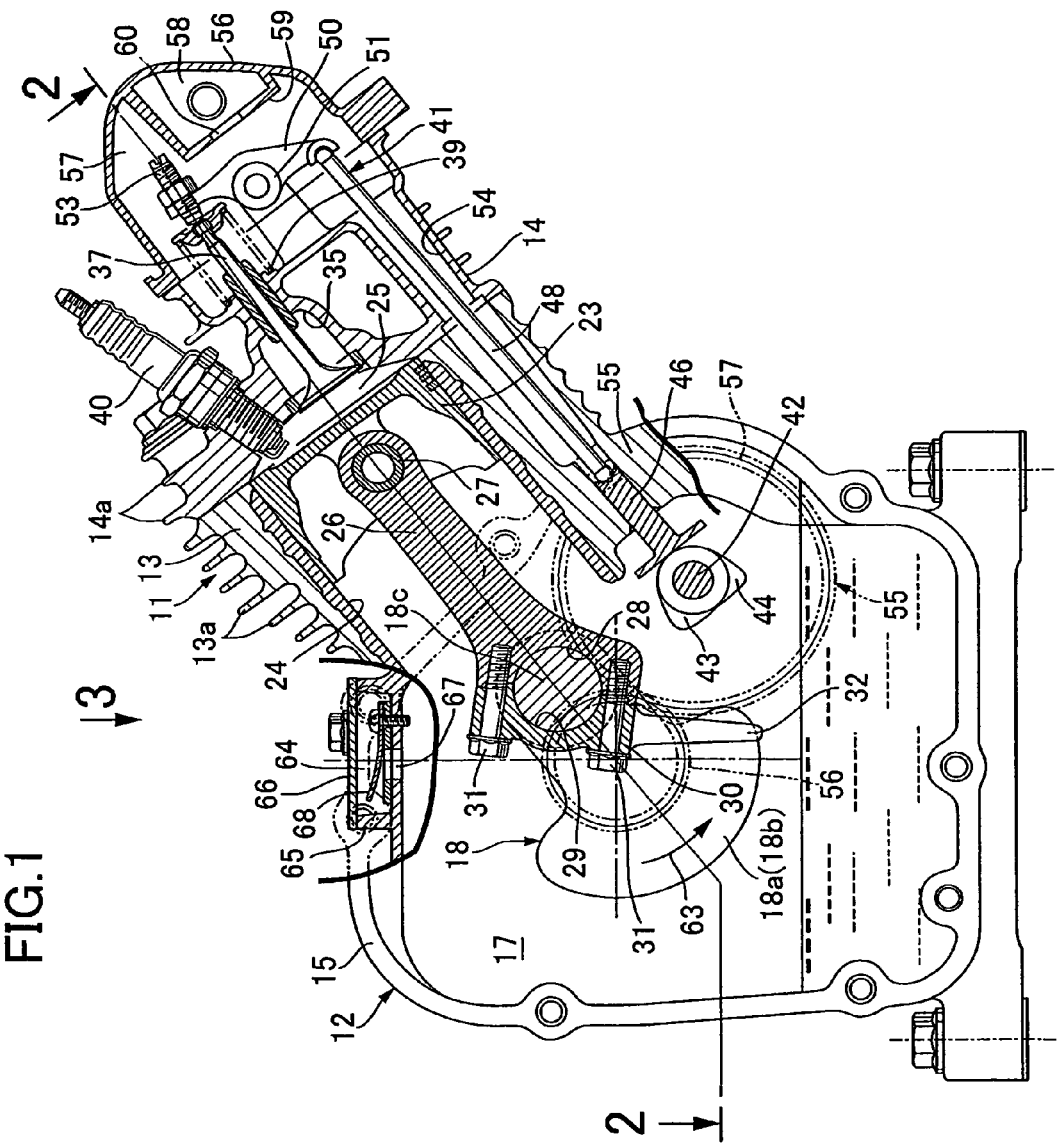
FIG. 1 to FIG. 7 show an embodiment of the present invention.
Figure 2:
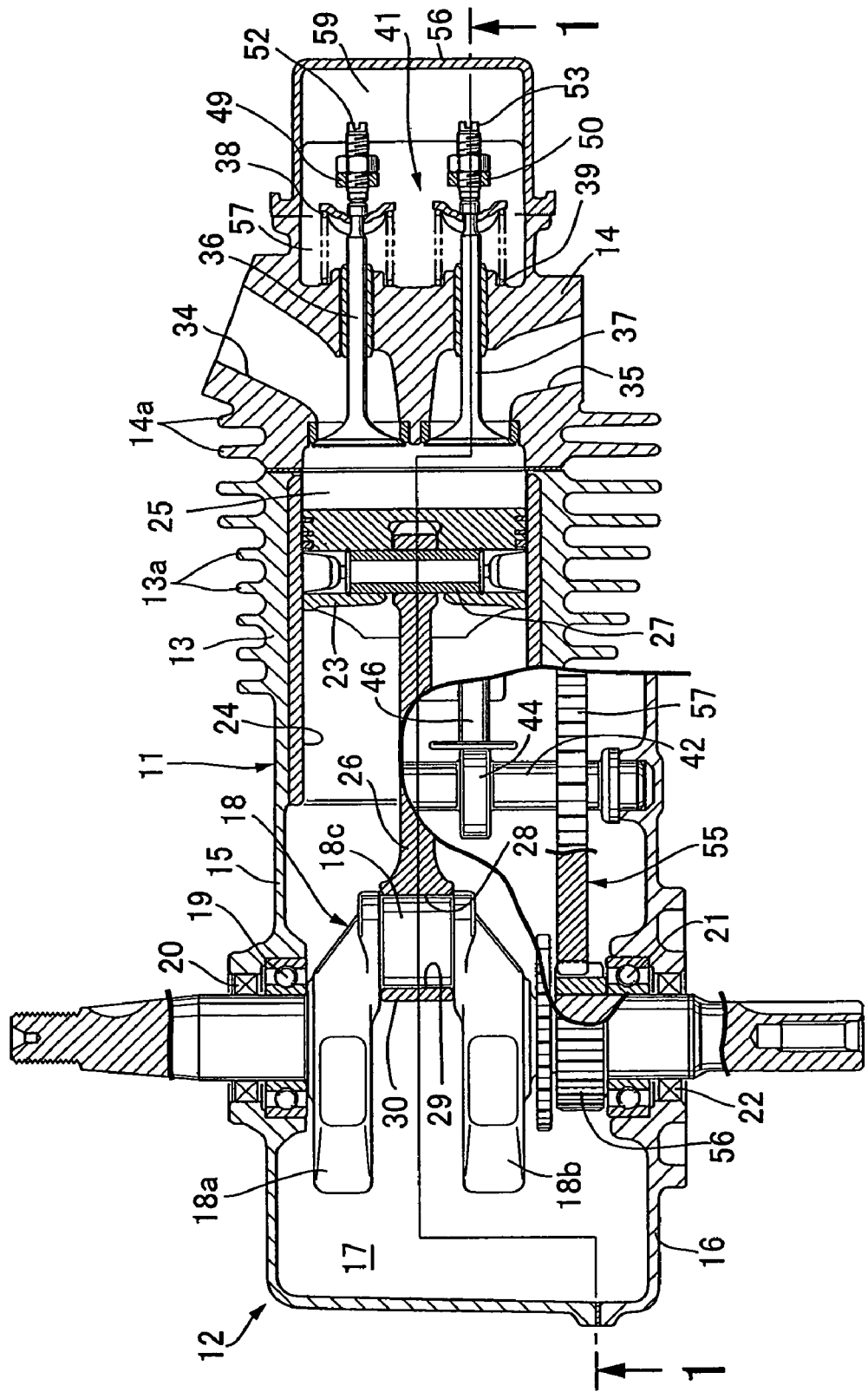
Figure 3:
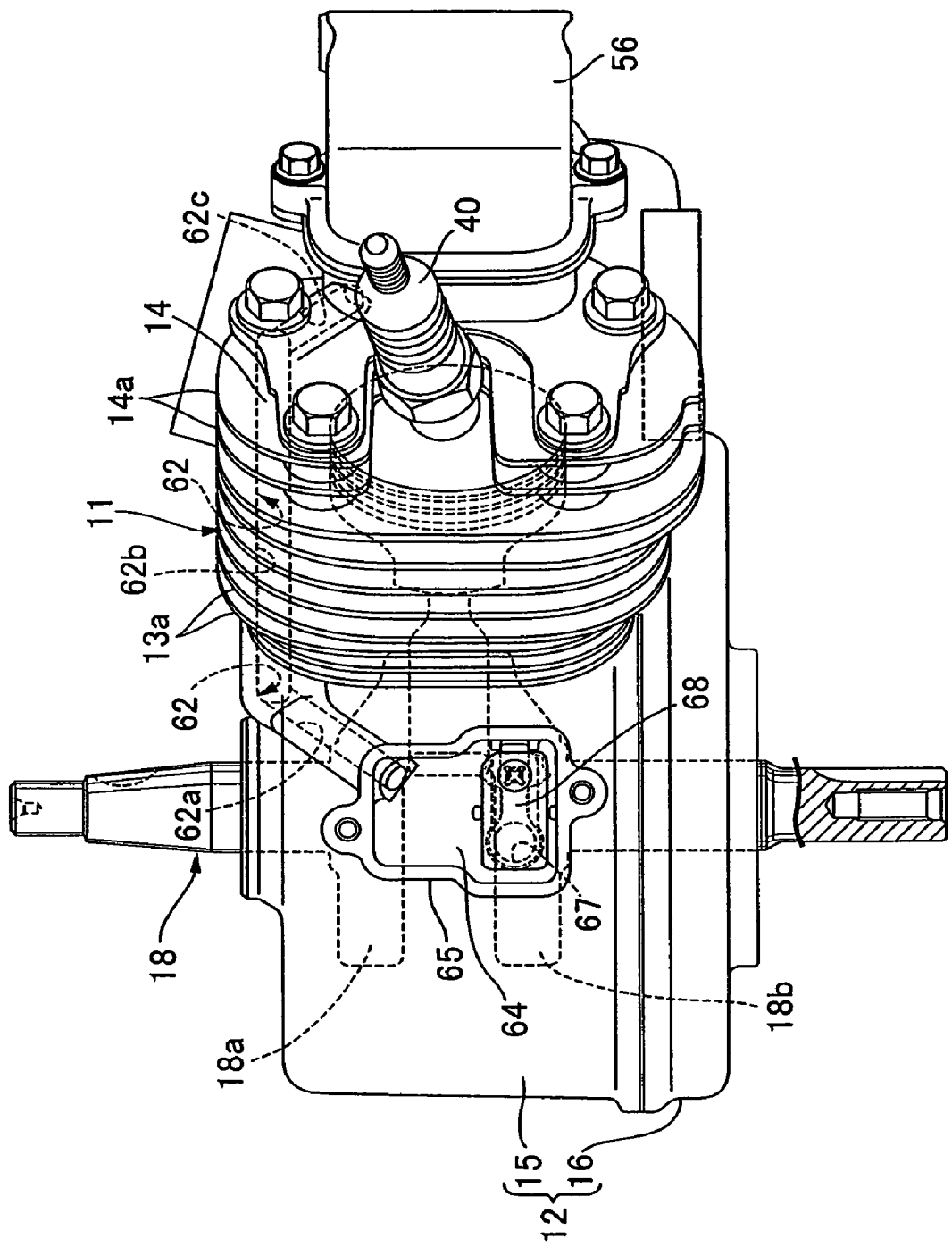

An embodiment of the present invention will be explained below with reference to FIG. 1 to FIG. 7.

First, in FIGS. 1 to 4, this engine is an air-cooled single cylinder engine, which is used for working machines and the like, for example. An engine body 11 includes: a crankcase 12; a cylinder block 13 protruding in upwardly tilting manner from one side surface of the crankcase 12; and a cylinder head 14 joined to a head portion of the cylinder block 13. A large number of air-cooling fins 13a and 14a are provided on outer side surfaces of the cylinder block 13 and the cylinder head 14.

The crankcase 12 comprises: a case main body 15 formed integrally with the cylinder block 13 by molding and opened at one side; and a side cover 16 fastened to the opened end of the case main body 15. A crank chamber 17 storing oil is formed inside the crankcase 12. A crankshaft 18 is rotatably supported in the crankcase 12. The crankshaft 18 integrally has a pair of counterweights 18a and 18b, as well as a crank pin 18c which connects between the counterweights 18a and 18b. Accordingly, opposite end portions of the crankshaft 18 rotatably penetrate the case main body 15 and the side cover 16 of the crankcase 12 and protrude outwardly. A ball bearing 19 and an annular sealing member 20 are disposed between the crankshaft 18 and the case main body 15, the sealing member 19 disposed on the outer side of the ball bearing 19, and a ball bearing 21 and an annular sealing member 22 are disposed between the crankshaft 18 and the side cover 16, the sealing member 22 disposed on the outer side of the ball bearing 21.

A cylinder bore 24 is formed in the cylinder block 13. A piston 23 is slidably fitted in the cylinder bore 24. A combustion chamber 25 is formed between the cylinder block 13 and the cylinder head 14, and a top portion of the piston 23 faces the combustion chamber 25. One end of a connecting rod 26 is connected to the piston 23 by using a piston pin 27, and the other end of the connecting rod 26 is connected to the crank pin 18c of the crankshaft 18. Specifically, a semicircular concave part 28 to which a substantially half of the periphery of the crank pin 18c is fitted is provided to the other end of the connecting rod 26i and a crank cap 30 is fastened to the other end of the connecting rod 26 by using multiple bolts 31, the crank cap 30 including a semicircular concave part 29 to which the residual substantially half of the periphery of the crank pin 18c is fitted.

In addition, an oil dipper 32 is integrally formed on the crank cap 29 so as to protrude, and serves as oil splashing means for splashing oil in the crank chamber 17 upon rotation of the crankshaft 18. The oil dipper 32 is housed in the crank chamber 17.

An intake port 34 and an exhaust port 35, both communicating with the combustion chamber 25, are formed in the cylinder head 14. In addition, an intake valve 36 for opening and closing the passage between the intake port 34 and the combustion chamber 25 as well as an exhaust valve 37 for opening and closing the passage between the exhaust port 35 and the combustion chamber 25 are disposed in the cylinder head 14 so as to be capable of performing the opening and closing operations. The intake valve 36 and the exhaust valve 37 are urged in a valve-closing direction by valve springs 38 and 39, respectively. Further, an ignition plug 40 is attached to the cylinder head 14. A front end portion of the ignition plug 40 faces the combustion chamber 25.

Figure 4:
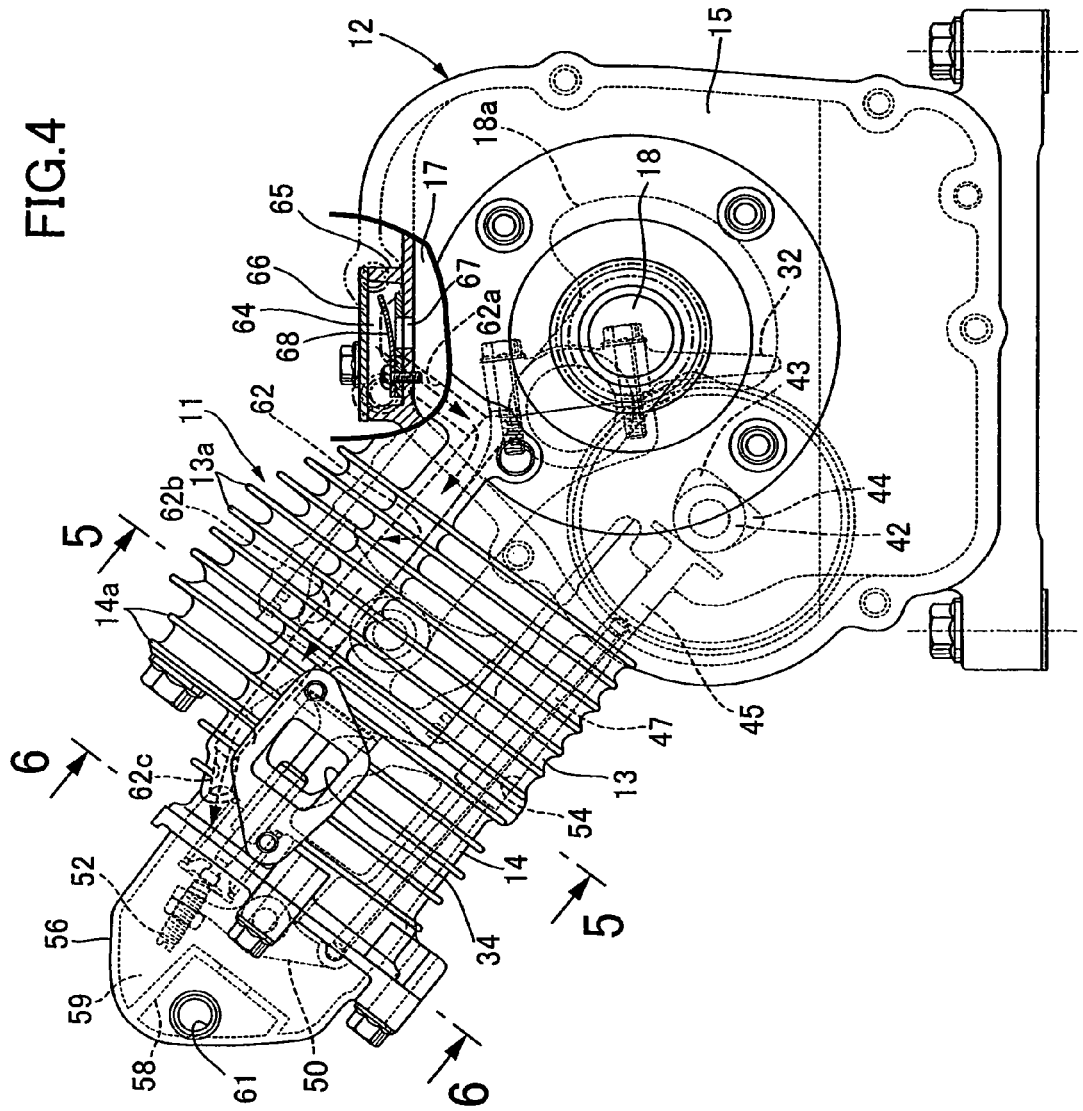
Figure 5:
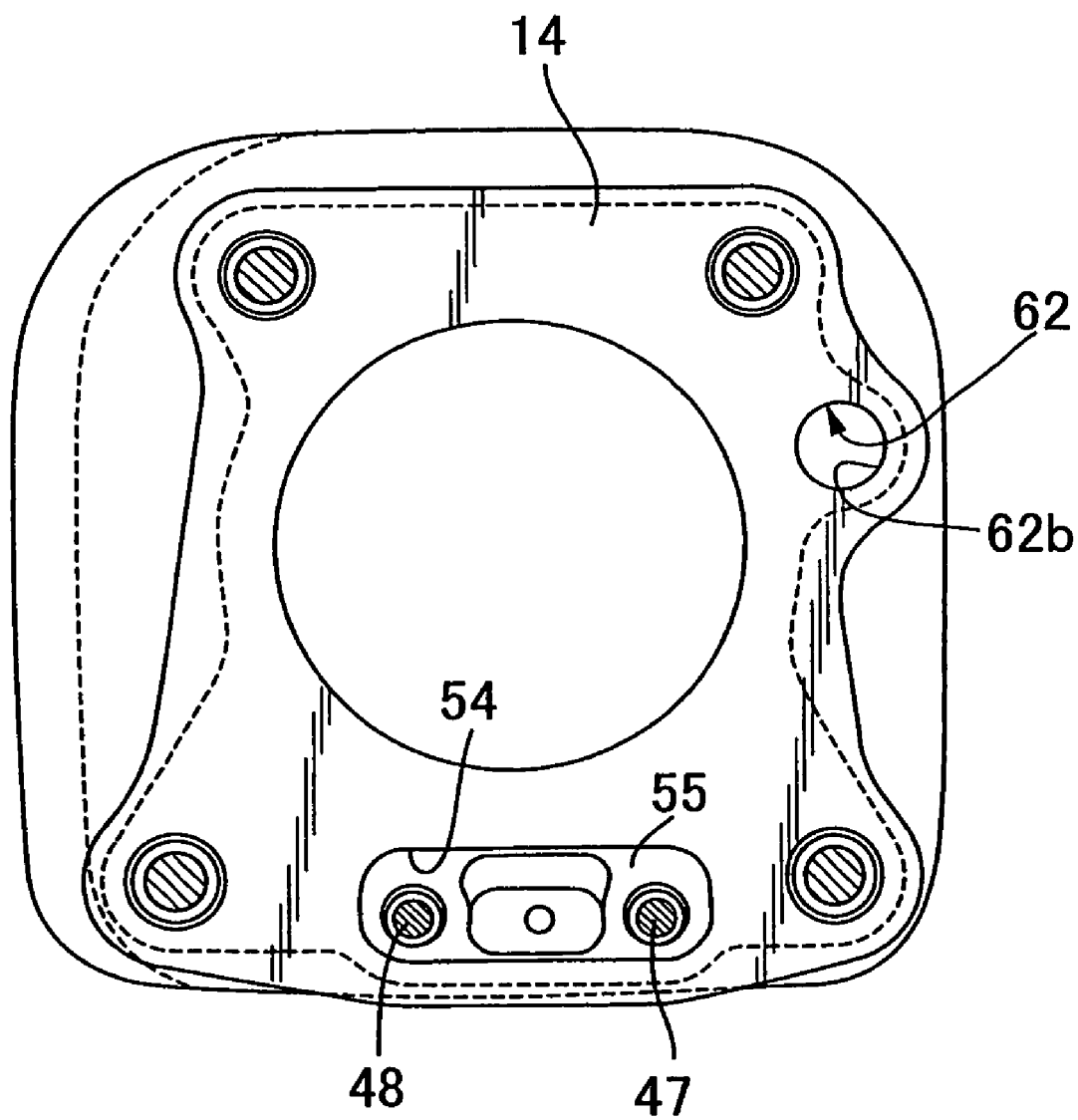

Referring to FIG. 5 in combination, a valve operating mechanism 41 opening and closing the intake valve 36 and the exhaust valve 37 includes: a cam shaft 42 including an intake cam 43 and an exhaust cam 44 and rotatably supported at the crankcase 12; an intake tappet 45 (See FIG. 4) supported at the cylinder block 13 so that the intake cam 43 causes the intake tappet 45 to slide up and down following motion of the intake cam 43; an exhaust tappet 46 supported at the cylinder block 13 so that the exhaust cam 44 causes the exhaust tappet 46 to slide up and down following motion of the exhaust cam 44; an intake push rod 47 (See FIGS. 4 and 5) continuously connected, at its lower end portion, with an upper end portion of the intake tappet 45 and extending in the up-down direction; an exhaust push rod 48 continuously connected, at its lower end portion, with an upper end portion of the exhaust tappet 46 and extending in the up-down direction; an intake rocker arm 49 having an axis parallel with the crankshaft 18 and swingably supported by a rocker shaft 51 provided to the cylinder head 14; and an exhaust rocker arm 50 swingably supported by the rocker shaft 51. One end portion of the intake rocker arm 49 is in contact with an upper end of the intake push rod 47, whereas one end portion of the exhaust rocker arm 50 is in contact with an upper end of the exhaust push rod 48. Tappet screws 52 and 53 are threaded respectively into the other end portions of the intake rocker arm 49 and the exhaust rocker arm 50 so that the forward/backward movement positions thereof can be adjusted, the tappet screws 52 and 53 being in contact with head portions of the intake valve 36 and the exhaust valve 37, respectively.

A passage hole 54 is formed in the cylinder block 13 and the cylinder head 14, with a supporting wall 55 interposed between itself and the crank chamber 17, to extend in parallel with an axis of the cylinder bore 24 under the cylinder bore 24. The intake tappet 45 and the exhaust tappet 46 are slidably disposed so as to penetrate the supporting wall 55. The intake push rod 47 and the exhaust push rod 48 are disposed so as to extend upward and downward in the passage hole 54.

The intake and exhaust rocker arms 49 and 50 and the rocker shaft 51 of the valve operating mechanism 41 are covered with a head cover 56. The head cover 56 includes a partition wall 59 for forming a first breather chamber 58 in the head cover 56 so that the first breather chamber 58 is partitioned from a valve operation chamber 57 in which the intake and exhaust rocker arms 49 and 50 and the rocker shaft 51 are disposed. The first breather chamber 58 is formed in a labyrinthine form, and the valve operation chamber 57 communicates with the first breather chamber 58 through a communication hole 60 formed in the partition wall 59. In addition, a connection hole 61 to which a pipe for guiding the gas in the first breather chamber 58 to an air cleaner (not illustrated) side is connected is formed in a side surface of the head cover 56.

Upon rotation of the oil dipper 32, housed in the crank chamber 17, together with the crankshaft 18 in the rotation direction indicated by an arrow 63 in FIG. 1, the oil stored in the crank chamber 17 is splashed by the oil dipper 32, thereby generating oil mist in the crank chamber 17. The gas, such as blow-by gas, including the oil mist is guided toward the cylinder head 14 through a breather passage 62 by pressure fluctuation in the crank chamber 17. The breather passage 62 is formed in the case main body 15 of the crankcase 12, the cylinder block 13 and the cylinder head 14, and lubricating oil is supplied, through the breather passage 62, to the intake and exhaust rocker arms 49 and 50 and the rocker shaft 51 in the valve operation chamber 57 formed between the cylinder head 14 and the head cover 56.

In a portion on which the oil mist splashed by the oil dipper 32 impinges, the portion corresponding to an upper portion of the case main body 15 of the crankcase 12, a second breather chamber 64 with which an end portion, on the crank chamber 17 side, of the breather passage 62 communicates is formed. Moreover, a rectangular wall part 65 is integrally formed on an upper portion outside surface of the case main body 15 of the crankcase 12 in an endlessly continuous manner, and protrudes upward. To protruding ends of the wall part 65, a cover member 66 is fastened. Thus, the second breather chamber 64 is formed between the upper portion outside surface of the case main body 15 and the cover member 66 so that the outer periphery thereof is defined by the wall part 65.

A communication hole 67 through which the crank chamber 17 communicates with the second breather chamber 64 is formed in the upper portion of the case main body 15 of the crankcase 12. A one-way valve 68 is attached to a portion surrounded by the wall part 65, the portion corresponding to an outside surface of the case main body 15 of the crankcase 12, and prevents backflow of gas and oil from the second breather chamber 64 toward the crank chamber 17 through the communication hole 67. The one-way valve 68 is attached to the outside surface of the case main body 15 to be located between the crank chamber 17 and the second breather chamber 64.

Figure 6:
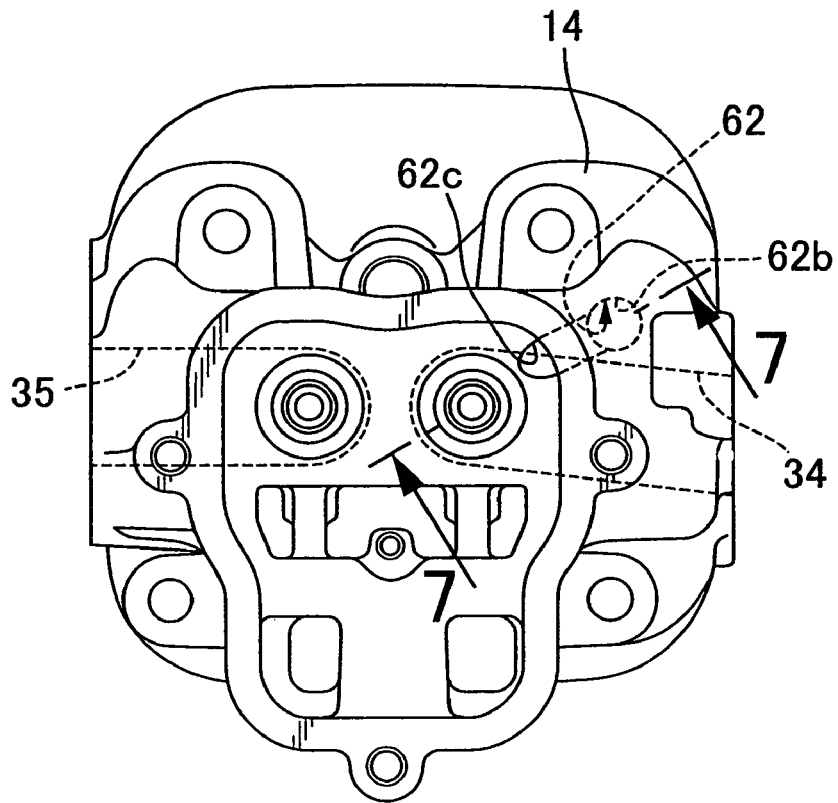
Figure 7:
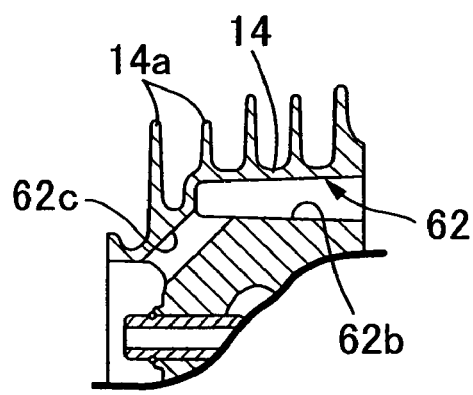

The breather passage 62 includes, in the following order from the second breather chamber 64 side: a first down passage part 62a formed in the case main body 15 to extend downward from the second breather chamber 64; an up passage part 62b formed in the case main body 15, the cylinder block 13 and the cylinder head 14 to extend from a lower end of the first down passage part 62a toward the cylinder head 14 and to be in parallel with the axis of the cylinder bore 24; and a second down passage part 62c formed in the cylinder head 14 to extend in an inclined manner from an upper end of the up passage part 62b toward the intake valve 38 as shown in FIG. 4, FIG. 6 and FIG. 7, and to be open at the valve operation chamber 57.

Next, operations of this embodiment will be described. The gas including oil mist generated in the crank chamber 17 by the oil dipper 32 is guided toward the cylinder head 14 through the breather passage 62 provided in the case main body 15 of the crankcase 12, the cylinder block 13 and the cylinder head 14. Thus, lubricating oil is guided toward the cylinder head 14 through the breather passage 62. The second breather chamber 64, communicating with the end portion, on the crank chamber 17 side, of the breather passage 62 is formed on the case main body 15 of the crankcase 12, and the one-way valve 68, preventing backflow of the oil toward the crank chamber 17, is attached to the case main body 15 to be located between the crank chamber 17 and the second breather chamber 64.

Accordingly, when the pressure in the crank chamber 17 increases due to pressure fluctuation in the crank chamber 17, gas including oil mist is guided to the second breather chamber 64 by the one-way valve 68, thus preventing backflow of the oil mist and the gas from the second breather chamber 64 to the crank chamber 17. Thus, backflow of the oil toward the crank chamber 17 is prevented and a sufficient amount of oil can be supplied to the cylinder head 14, even when the head difference between the crank chamber 17 and the cylinder head 14 is large.

Moreover, the first down passage part 62a extending downward from the second breather chamber 64 is formed at the position, on the second breather chamber 64 side, of the breather passage 62. Accordingly, backflow of the oil from the second breather chamber 64 toward the crank chamber 17 can be prevented, while the oil liquefied in the second breather chamber 64 and the breather passage 62 can be stored in the first down passage part 62a. Thereby, the oil stored in the first down passage part 62a by the action of the pressure from the crank chamber 17 can be efficiently conveyed toward the cylinder head 14.

An embodiment of the present invention is explained above, but the present invention is not limited to the above-mentioned embodiment and may be modified in a variety of ways as long as the modifications do not depart from its gist.

The invention claimed is:

1. A cylinder head lubricating structure for an engine, comprising:
    a crankcase forming a crank chamber storing therein oil and rotatably supporting a crankshaft;
    a cylinder block;
    a cylinder head connected to the crankcase with the cylinder block interposed therebetween, the cylinder head having an intake valve and an exhaust valve disposed therein which are capable of opening and closing;
    an oil dipper housed in the crank chamber which splashes the oil in accordance with rotation of the crankshaft; and
    a breather passage formed in the crankcase, the cylinder block and the cylinder head, said breather passage guiding gas including oil mist generated in the crank chamber by the oil dipper to the cylinder head,
    wherein lubricating oil is supplied toward the cylinder head through the breather passage,
    wherein the crankcase includes a breather chamber which communicates with an end portion, on the crank chamber side, of the breather passage,
    wherein a one-way valve is attached to the crankcase and is located between the crank chamber and the breather chamber, the one-way valve preventing backflow of the oil toward the crank chamber.

2. The cylinder head lubricating structure for an engine, according to claim 1, wherein a down passage part extending downward from the breather chamber is formed at a position, on the breather chamber side, in the breather passage.

* * * * *